US009020754B2

(12) United States Patent
Modica et al.

(10) Patent No.: US 9,020,754 B2
(45) Date of Patent: Apr. 28, 2015

(54) VEHICLE ARRIVAL PREDICTION

(71) Applicant: Navteq B.V., Veldhoven (NL)

(72) Inventors: Leo Modica, Wheaton, IL (US); Leon Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 93 days.

(21) Appl. No.: 13/849,012

(22) Filed: Mar. 22, 2013

(65) Prior Publication Data

US 2014/0288821 A1 Sep. 25, 2014

(51) Int. Cl.
*G06F 19/00* (2011.01)
*G08G 1/123* (2006.01)

(52) U.S. Cl.
CPC .................................... *G08G 1/123* (2013.01)

(58) Field of Classification Search
CPC ... G08G 1/0969; G08G 1/0962; G08G 1/123; G08G 1/202; G08G 1/096827; G08G 1/096838; G08G 1/205; G08G 1/0129; G08G 1/09675; G08G 1/096783; G08G 1/096791; G08G 1/096822; G08G 1/096894; G08G 1/02
USPC .................... 701/117, 465, 468, 532; 73/597, 73/861.27, 861.95; 340/988, 991, 994; 600/485, 494, 500; 709/224; 250/288
See application file for complete search history.

(56) References Cited

U.S. PATENT DOCUMENTS 5,924,075 A 7/1999 Kanemitsu
5,948,040 A * 9/1999 DeLorme et al. ............. 701/426
6,006,159 A * 12/1999 Schmier et al. ............... 701/465
6,282,487 B1 8/2001 Shiomi et al.
6,317,685 B1 11/2001 Kozak et al.
6,401,031 B2 6/2002 Ogawa
6,470,263 B2 10/2002 Ito et al.
6,700,506 B1 * 3/2004 Winkler et al. ............... 340/994
8,116,751 B2 * 2/2012 Aaron ........................... 455/415
2008/0054072 A1 * 3/2008 Katragadda et al. .......... 235/384

(Continued)

FOREIGN PATENT DOCUMENTS

CN 101388143 4/2011
CN 102074124 5/2011

(Continued)

OTHER PUBLICATIONS

Shalaby, A., and A. Farhan. Bus Travel Time Prediction for Dynamic Operations Control and Passenger Information Systems. CD-ROM. 82nd Annual Meeting of the Transportation Research Board, National Research Council, Washington D.C., Jan. 2003, published at Transportation Research Board (TRB).

(Continued)

*Primary Examiner* — McDieunel Marc
(74) *Attorney, Agent, or Firm* — Lempia Summerfield Katz LLC

(57) ABSTRACT

A method and apparatus for predicting the arrival time of a transit vehicle at a transit stop of a transit route is presented. The arrival time is predicted using historical location information of a plurality of vehicles that have previously traveled the route, location information of several of the most recent vehicles that have arrived at the stop, and current location information of a particular vehicle currently traveling the route. Values such as average arrival times and arrival time errors or variances are determined from the historical and recent location data. These values are used with the current location information to predict the arrival time of the particular vehicle.

21 Claims, 7 Drawing Sheets

(56) References Cited

U.S. PATENT DOCUMENTS

| | | | | |
|---|---|---|---|---|
| 2010/0036601 | A1* | 2/2010 | Ozawa et al. | 701/201 |
| 2010/0042317 | A1* | 2/2010 | Tajima et al. | 701/201 |
| 2011/0161001 | A1* | 6/2011 | Fink | 701/201 |
| 2011/0231091 | A1 | 9/2011 | Gourlay et al. | |

FOREIGN PATENT DOCUMENTS

| | | | |
|---|---|---|---|
| CN | 102157075 | | 8/2011 |
| JP | 2003042776 | | 2/2003 |
| WO | WO 98/07045 | | 2/1998 |
| WO | WO 2007/145625 | | 12/2007 |
| WO | W02012034083 | A2 | 3/2012 |

OTHER PUBLICATIONS

International Search Report and Written Opinion cited in PCT/EP2014/051492, mailed May 21, 2014.

* cited by examiner

VEHICLE ARRIVAL PREDICTION

FIELD

The following disclosure relates to vehicle transportation systems and transit related applications, and more specifically to predicting transit system vehicle arrival times.

BACKGROUND

Transit systems typically operate with defined routes including planned stopping points where transit system users can board transit vehicles. The layout of these stopping points is designed to correlate to a schedule that allows a transit vehicle to travel and arrive at specific stopping points at specific stopping times. Transit system users depend on schedules of these specific stops and stopping times to plan trips using the transit system.

Often transit vehicles vary from schedules because of traffic density variations, ridership variations, route variations, weather variations, and other issues that can cause a transit vehicle to run ahead or behind schedule. When a transit vehicle varies from a planned schedule a transit system user may not have knowledge of the variations, and may lose confidence in the transit system because of the frustrations involved with the unpredictable nature of the transit system's schedule. If a user becomes frustrated with a transit system, the user may choose alternate forms of transit.

SUMMARY

In an embodiment, a dynamically weighted method predicts the arrival time of transit vehicles at transit stops. The method may use historical, recent, and current transit vehicle location data, along with route data, to determine transit system historical, recent, and current characteristics. The historical, recent, and current characteristics may then be used to predict a time when a specific transit vehicle will arrive at a specific stop on a transit route.

In an embodiment, a method includes receiving historical location information associated with times for a historical plurality of vehicles along a route. The route comprises a plurality of route stops. The method further involves, determining a historical mean arrival time, and associated historical arrival time variance, for a stop along the route using the historical location information. The method then involves, receiving recent location information associated with times for a recent plurality of vehicles along the route. The method also involves, determining a recent arrival time variance from the historical mean arrival time at the stop, and a recent arrival time variance error at the stop, for the recent plurality of vehicles using the recent location information. The method further involves, receiving current location information for a particular vehicle along the route, wherein the current location information comprises a specific current location. The method then involves, determining a travel time to the stop for the particular vehicle along the route from the particular vehicle's specific current location. The method then predicts a time of arrival of the particular vehicle at the stop along the route as a function of the historical mean arrival time, the historical arrival time variance, the recent arrival time variance, the recent arrival time variance error, and the travel time of the specific vehicle to the stop.

In an embodiment, a sliding window adaptive filter uses a variance and a variance error from a historical mean arrival time for the last several vehicles that have arrived at a stop to predict the arrival time of a particular vehicle at a specific stop.

In an embodiment, predicting the time of arrival involves fusing a historical mean, or average, arrival time at a stop with recent arrival times at a stop by determining a weighted historical mean arrival time weighted proportionally based on the recent arrival time variance error, determining a weighted recent arrival time, wherein the weighted recent arrival time is determined by summing the recent arrival time variance and the travel time to the stop for the specific vehicle. The embodiment further involves weighing the result proportionally based on the historical arrival time variance, and summing the weighted historical mean arrival time and the weighted recent arrival time.

BRIEF DESCRIPTION OF THE DRAWINGS

Exemplary embodiments of the present invention are described herein with reference to the following drawings.

DETAILED DESCRIPTION

Methods and systems are presented for predicting vehicle arrival time in an environment where vehicle locations are tracked in real-time and over a period of time. Specifically, embodiments are presented for a dynamically weighted vehicle arrival prediction scheme. The scheme may involve fusing historical arrival time information with recent arrival time information to accurately predict the arrival of a vehicle at a specific stop in a transit route. The historical arrival time information and recent arrival time information are fused through a variation in weights on historical and recent arrival time statistics. The weights are determined based on the historical and recent arrival time variances as a measure of the errors of each set of data. The historical variance may be determined during a route derivation stage from historic data. The recent arrival time variance may be estimated using a sliding window adaptive limited filter scheme. The limited filter scheme estimates recent error properties according to a gap between a historical mean and recent arrival times at a transit stop. In this way multiple factors that affect the arrival time of a vehicle are accounted for without being independently modeled. For example, factors such as weather, construction, and ridership do not need to be modeled separately.

In an embodiment, a historical average arrival time is determined, along with an associated historical arrival time variance, for a stop along a route using historical location information for a historical plurality of vehicles along the route. An embodiment further involves determining a recent arrival time variance from the historical average arrival time at the stop for a recent plurality of vehicles using times for a recent plurality of vehicles along the route. The embodiment also involves determining a travel time to the stop for a particular vehicle along the route from a specific current location for the particular vehicle along the route. The embodiment then involves predicting a time of arrival of the particular vehicle at the stop along the route as a function of the historical average arrival time, the historical arrival time variance, the recent arrival time variance, and the travel time of the particular vehicle to the stop.

Figure 1:
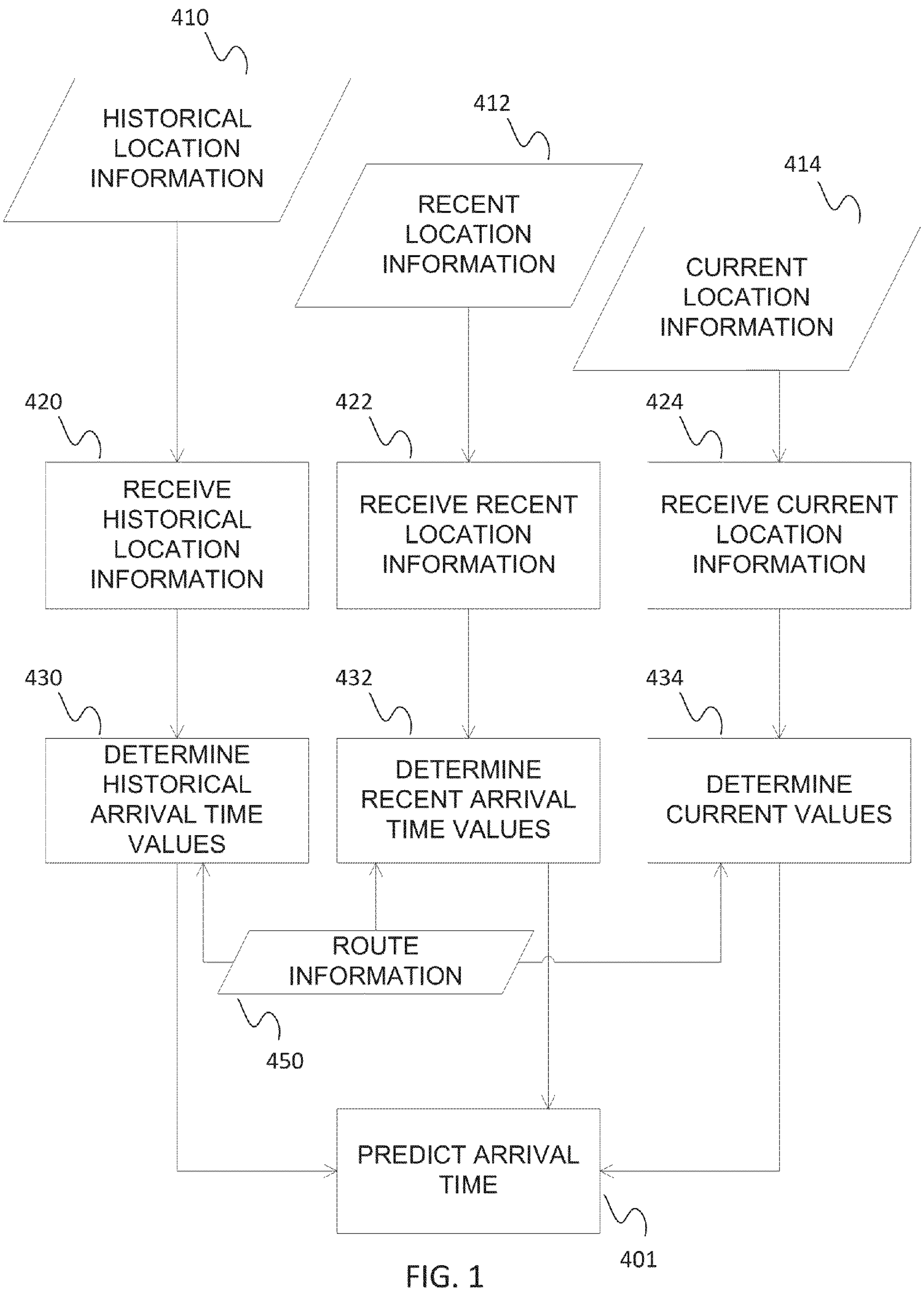
FIG. 1 illustrates an exemplary vehicle arrival prediction system.

FIG. 1 illustrates an exemplary vehicle arrival prediction system. The vehicle arrival prediction system may predict the arrival of vehicles at scheduled stops in a transit system.

At act 420 historical location information 410 for a plurality of vehicles is received. Location information may have associated geographic, or spatial, components and temporal components. The geographic component may indicate a specific geographic location. The temporal component may be a time of day that a vehicle of the plurality of vehicles is at a specific location indicated in the location information. The temporal component may be a time stamp that the location information was recorded. The temporal component may be a total count of time that a vehicle of the plurality of vehicles was active in the transit system at the time the location information was recorded.

At act 430 the historical location information 410 received in act 420 is correlated with route information 450 to determine historical arrival time values.

Route information 450 may include a collection of geographic points that indicate a location where a vehicle of a transit system is scheduled to stop while traveling along a particular route. Route information may be manually preplanned, or automatically determined from mobile device data.

Combining the temporal and geographic components of the historical location information 410 with the route information 450 may indicate temporal concentrations when vehicles are in the vicinity of a particular stop identified in the route information 450. For example, assigning a boundary or limit around the geographic locations of stops may create a threshold that indicates a vehicle has arrived at a stop when location information of a vehicle indicates that the vehicle is within the threshold. The temporal component of the location information may then indicate when the vehicle arrived at a particular stop. In an embodiment, the threshold can be 200 meters. In this embodiment, if location information indicates that a vehicle is within 200 meters of a specific stop at 7:01 AM, the vehicle would be considered to have arrived at the stop at 7:01 AM.

The historical arrival time values may include a historical average arrival time at a particular stop for a group of the vehicles traveling along a particular route. The historical average arrival time may be determined by any known statistical or observational method. For example, the historical location information 410 may include information about a period of three days. The historical location information 410 may indicate that over the three day period vehicles arrived at a particular stop at 7:00 AM, 7:01 AM, and 7:02 AM. This may then indicate a historical average arrival time at this stop of 7:01 AM, determined as the simple average or mean.

The historical arrival time values may vary. This variance may be quantified by any known method, and considered an error in the historical average arrival time. In the previous example, the historical arrival time variance may be an absolute deviation of 0.66 minutes.

In an embodiment, historical location information can take the form of multiple mobile device Global Positioning System (GPS) reports. Clusters of a temporal property of the GPS reports can be determined. From the clusters, values such as a centroid, or average, and a variance can be determined.

In act 422 recent location information 412 is received for a plurality of vehicles. The recent location information 412 may include location information of a set number of previous vehicles that were the most recent vehicles to arrive at a particular stop on a route. For example, the recent location information 412 may include location information from the most recent 2, 4, 7, or 8 vehicles to arrive at a particular stop. The recent location information 412 may be a subset of the historical location information 410. The recent location information 412 may also be totally separate from the historical location information 410.

In act 432 recent arrival time values may be determined using the recent location information 412 received in act 422 and route information 450. Recent arrival time values may include a recent arrival time variance and a recent arrival time variance error, both determined with respect to a historical average arrival time for a particular stop. The recent arrival time variance and the recent arrival time variance may be considered noise, total variance, or total error, in the measurement of the recent arrival times. The recent arrival time variance and the recent arrival time variance may be determined using a sliding window adaptive filter model. A sliding window adaptive filter model uses values determined from the last several vehicles that have arrived at a stop to determine recent arrival time total error.

In an embodiment, the sliding window adaptive filter model may be configured as described below in Equation 1 and Equation 2.

The recent arrival time variance may be determined using the relationship in Equation 1.

$$r_i = r_{i-1} + \frac{1}{h} \cdot (\bar{r}_i - \bar{r}_{i-h}) \qquad \text{Eq. 1}$$

In Equation 1, $r_i$ is the recent arrival time variance for the most recent vehicle at the stop, $r_{i-1}$ is the recent arrival time variance of the vehicle that arrived at the stop most recently previous to the previous vehicle, h is the number of vehicles represented in the recent location information 412, $\bar{r}_i$ is the variance of the arrival time of the most recent vehicle at the stop from the historical arrival time, and $\bar{r}_{i-h}$ is the variance of all h vehicles represented in the recent location information 412 from the historical arrival time. In an embodiment, $\bar{r}_i$ may be a difference between an average historic arrival time and the most recent arrival time. For example, if a historic arrival time is 10:00 AM, and the most recent arrival time is determined as 10:03 AM, then $\bar{r}_i$ would be three minutes.

The recent arrival time variance error may be determined using the relationship in Equation 2

$$R_i = R_{i-1} + \frac{1}{h-1} \cdot \left[ (\bar{r}_i - r_i)^2 - (\bar{r}_{i-h} - r_i)^2 + \frac{1}{h} \cdot (\bar{r}_i - \bar{r}_{i-h})^2 + \frac{h-1}{h} \cdot (Q_{i-h} - Q_i) \right] \qquad \text{Eq. 2}$$

In Equation 2, $R_i$ the recent arrival time variance error for the most recent vehicle at the stop, $R_{i-1}$ is the recent arrival time variance error of the vehicle that arrived at the stop most recently previous to the previous vehicle, $Q_{i-h}$ is the historical arrival time variance of a number of stops previous to the stop, and $Q_i$ is the historical arrival time variance for the stop.

In act 424 current location information 414 for a particular vehicle along a route is received.

In act 434 the current location information 414 received in act 424 and route information 450 are used to determine current values for the particular vehicle. Current values for a particular vehicle may include a route that the particular vehicle is currently traveling, a current location on that route for the particular vehicle, and a speed of the particular vehicle. The current location of the vehicle may be prior to a particular stop on the route. Current values may also include a projected amount of time that it will take for the vehicle to travel from the current location of the vehicle to a stop on the route. This projected travel time may be determined as a distance to a stop divided by the speed of the vehicle. The projected travel time may also be determined using the historical location information 410 to determine the average length of time that is required for a vehicle to travel from the particular vehicle's current position on the route to a stop.

In act 401 a time of arrival of a particular vehicle at a stop along a route is determined as a function of the historical mean arrival time and the historical arrival time variance determined in act 430, the recent arrival time variance and the recent arrival time variance error determined in act 432, and the travel time of the particular vehicle to the stop determined in act 434.

The function used in act 401 to predict a time of arrival of a particular vehicle at a stop along a route may involve determining a weighted historical mean arrival time weighted proportionally based on the recent arrival time variance error. The function may also involve determining a weighted recent arrival time, wherein the weighted recent arrival time is determined by summing the recent arrival time variance and the travel time to the stop for the specific vehicle, and weighing the result proportionally based on the historical arrival time variance. The function may then also involve summing the weighted historical mean arrival time to the weighted recent arrival time to determine a predicted time of arrival of a particular vehicle at a stop.

Figure 2:
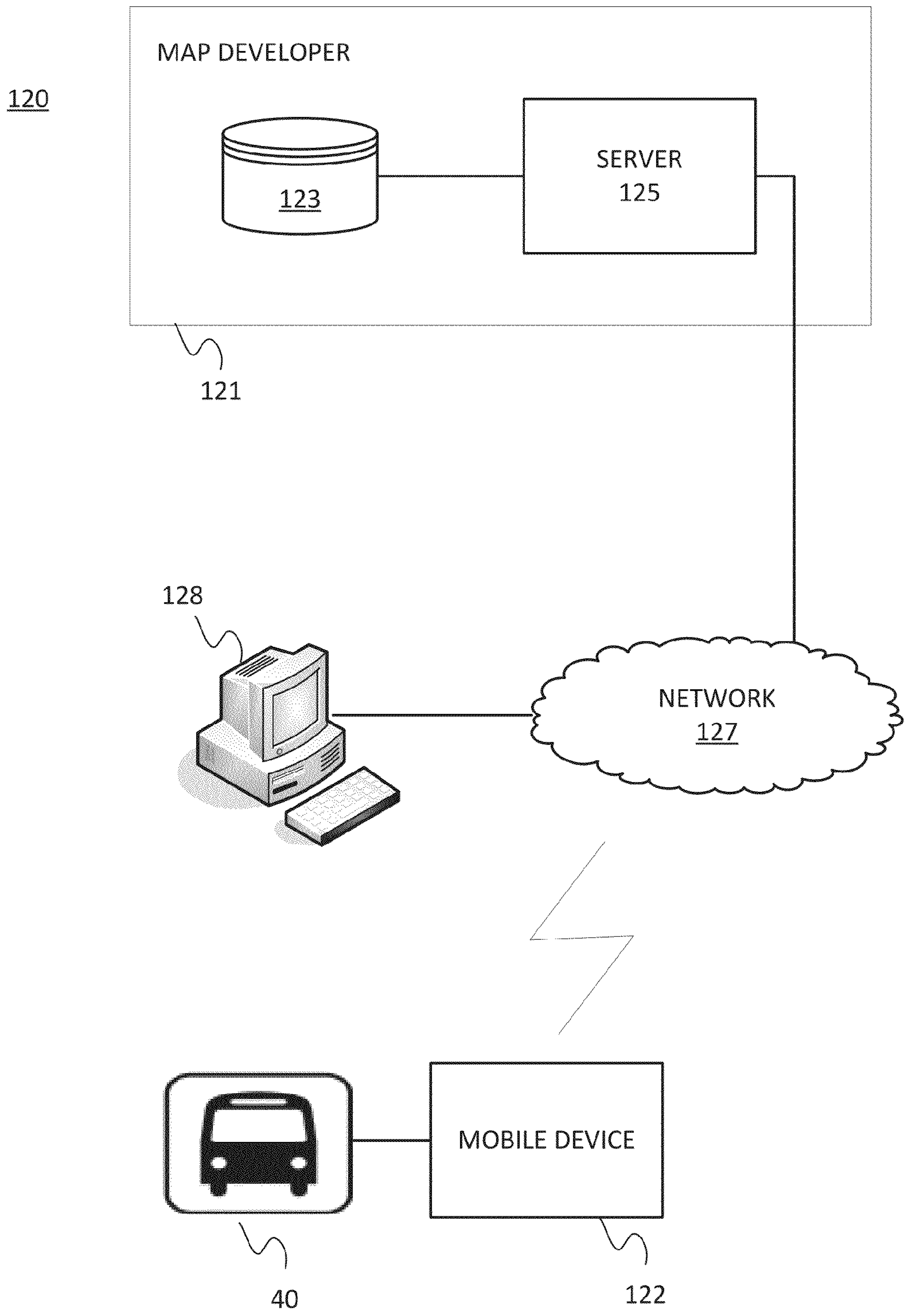
FIG. 2 illustrates an exemplary mapping or navigation system of the vehicle arrival prediction system of FIG. 1.

FIG. 2 illustrates an exemplary mapping or navigation system. The navigation system 120 includes a map developer system 121, a mobile device 122, and a network 127. Additional, different, or fewer components may be provided. For example, many mobile devices 122 may connect with the network 127. A vehicle 40 may also be associated with the mobile device 122, or the vehicle 40 may be the mobile device 122.

The developer system 121 includes a server 125 and a database 123. The developer system 121 may include computer systems and networks of a system operator such as NAVTEQ or NOKIA Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for navigation-related applications. The geographic data may include data representing a road network including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include routes and transit routes. Geographic data may be used as, or correlated with, location information or data to predict the arrival time of a vehicle 40 at a stop on a transit route.

The mobile device 122 includes one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122.

The mobile device 122 may communicate location information via the network 127 to the server 125. The server 125 may use the location information received from the mobile device 122 to associate the mobile device 122 with a vehicle 40 traveling on a route described in the geographic database 123. Server 125 may also associate the mobile device 122 with a vehicle 40 manually.

The server 125 may receive location information from multiple mobile devices 122 each associated with a vehicle 40. The server 125 may also determine a speed and direction of travel of the vehicle 40. The server 125 may use the location information provided by the mobile devices 122 with the geographic database 123 to determine historical arrival time values, current arrival time values, current values, or to predict the arrival time of a particular vehicle 40 at a stop on a transit route. The server 125 may then communicate the predicted arrival time to a mobile device 122 via the network 127.

A vehicle 40 may be any kind for vehicle. For example a vehicle may be a car, bus, airplane, train, or any other object capable of vehicular movement.

The computing resources for predicting and determining may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 3:
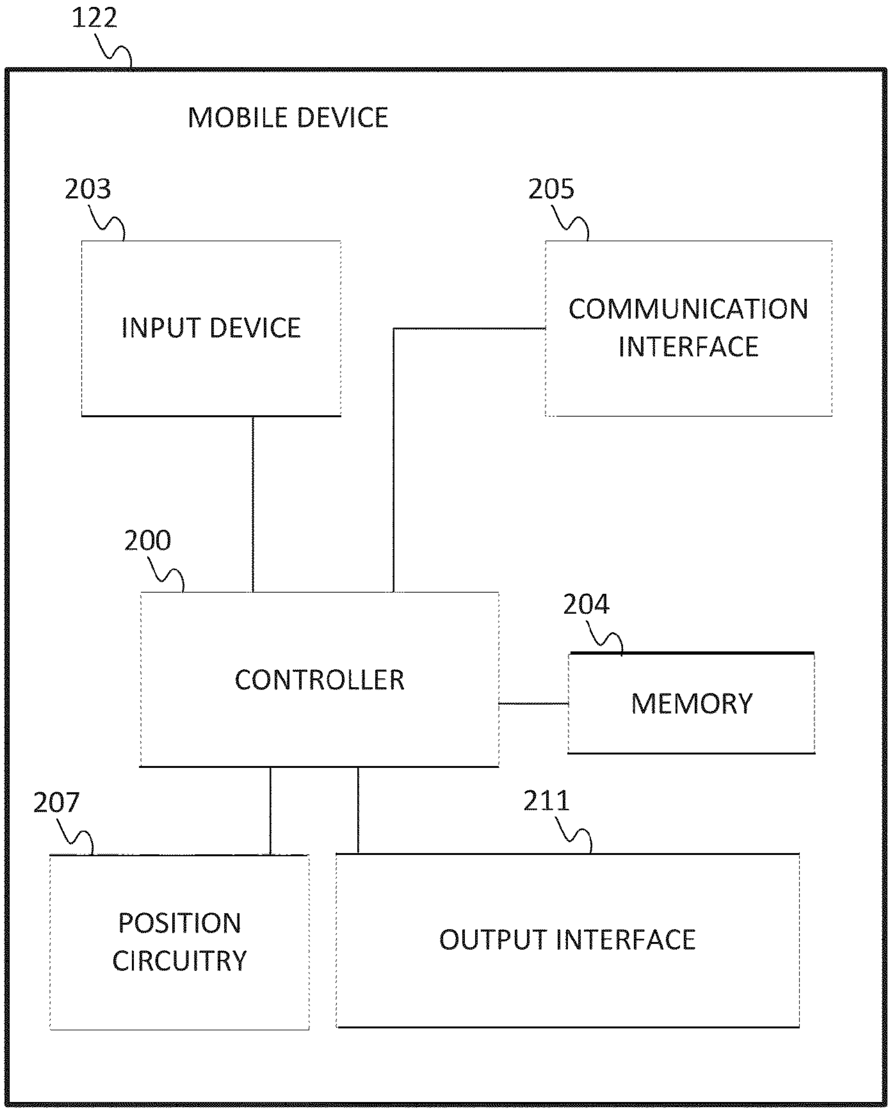
FIG. 3 illustrates an exemplary mobile device of the mapping or navigation system of FIG. 2.

FIG. 3 illustrates an exemplary mobile device 122 of the vehicle arrival time prediction system of FIG. 1. The mobile device 122 may be referred to as a navigation device. The mobile device 122 includes a controller 200, a memory 204, an input device 203, a communication interface 205, position circuitry 207, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, and/or any other known or later developed mobile device. The positioning circuitry 207, which is an example of a positioning system, is configured to determine a geographic position of the mobile device 122.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

Location data may have spatial and temporal elements. For example, the controller 200 may associate a specific time that a position of mobile device 122 was determined using the position circuitry 207. This specific time may be associated with the determined position and saved as location data in memory 204, or transmitted to server 120. Location data with a temporal element may be considered time stamped.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The communication interface 205 is configured to receive data indicative of a predicted time of arrival of a vehicle at a stop along a transit route. The position circuitry 207 is configured to determine the current location of the mobile device. The controller 200 is configured to determine the closest stop of a transit route to the mobile device 122. The output interface 211 is configured to present the predicted time of arrival of a vehicle at a stop along the transit route. In an embodiment, the output interface 211 is configured to prompt the user for a requested transit stop, and the input device 203 is configured to receive input indicated a requested transit stop.

In an embodiment, the input device 203 is configured to accept input from a user requesting the arrival time of the next transit vehicle at a transit stop, and the output interface 211 is configured to provide the arrival time. In another embodiment, the input device 203 is configured to accept input from a user requesting the length of time until the next transit vehicle arrives at a transit stop, and the output interface 211 is configured to provide the time to arrival. In another embodiment, the output interface is configured to provide a sequence of the times to arrival, or arrival times, of multiple transit vehicles.

In an embodiment, the communication interface 205 may be configured to receive historical values and recent values determined in act 430 and act 432 of FIG. 1. The controller 200 is then configured to determine the current values in act 434 of FIG. 1, and predict a time of arrival of a vehicle at a stop along a transit stop. In an embodiment, the controller 200 predicts the time of arrival of a vehicle associated with mobile device 122 at a stop along a route that the vehicle is currently traveling.

Figure 4:
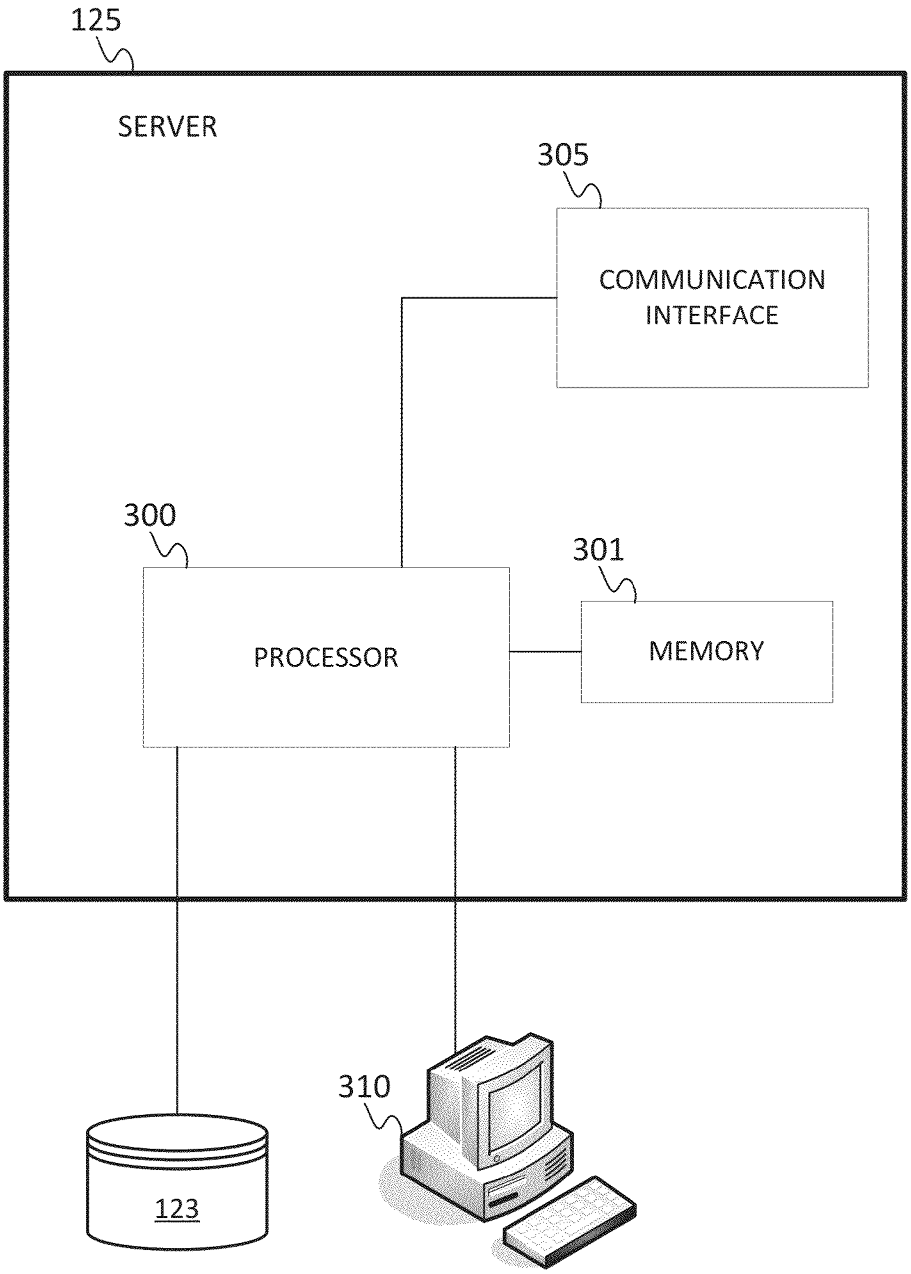
FIG. 4 illustrates an exemplary server of the mapping or navigation system of FIG. 2.

FIG. 4 illustrates an exemplary server 125 of the vehicle arrival prediction system of FIG. 1. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 receives data indicative of inputs made via the mobile device 122.

The communication interface 305 is configured to receive data representing historical location information associated with times for a plurality of vehicles along a route, recent location information associated with times for a recent plurality of vehicles along the route, and current location information for a particular vehicle along the route, and the memory 301 is configured to store all the data representing location information and data representing route information. The memory 301 data may also be configured to store data representing associations between specific mobile devices 122 and specific vehicles 40, and associations between specific vehicles 40 and transit routes.

The processor 300 is configured to determine a historical average arrival time and an associated arrival time variance for a stop using historical information data stored in memory 301. The processor 300 is also configured to determine a recent arrival time variance from the historical mean arrival time at a stop, and a recent arrival time variance error at the stop, for a recent plurality of vehicles using recent location information stored in memory 301. The processor 300 is also configured to determine a travel time to a stop for a particular vehicle along a route from the particular vehicle's specific current location received by communication interface 305 and/or stored in memory 301. The processor 300 is also configured to predict a time of arrival of the particular vehicle at the stop along the route as a function of the historical mean arrival time, the historical arrival time variance, the recent arrival time variance, the recent arrival time variance error, and the travel time of the particular vehicle to the stop.

In an embodiment, the historical and recent location information may be stored in memory 301, and not received through communication interface 305. In this embodiment, the historical and recent location information may be provided to the memory 301 through the workstation 310, or any other method to make the historical and recent location information available for the processor 300.

Figure 5:
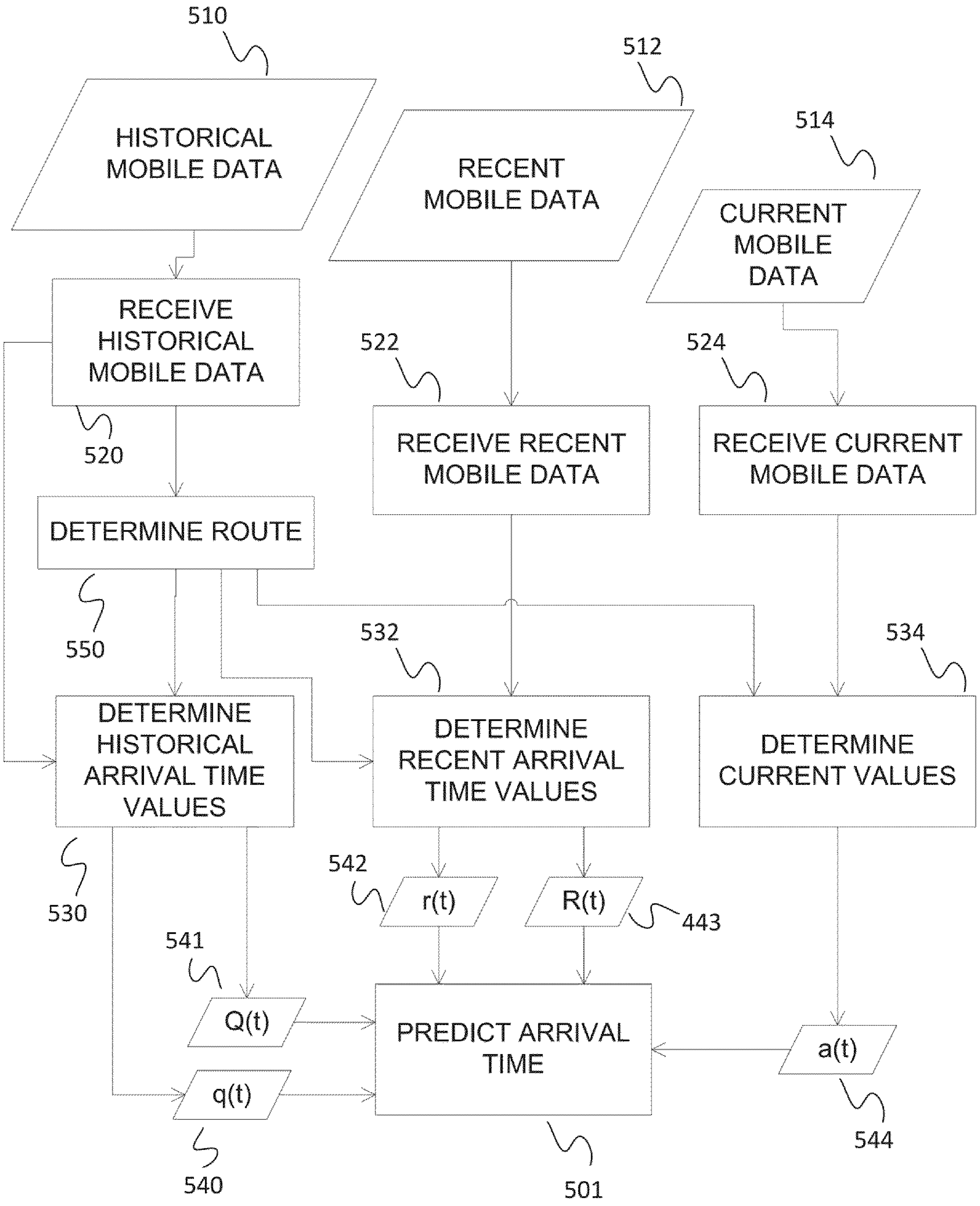
FIG. 5 illustrates an example flowchart for predicting vehicle arrival times.

FIG. 5 illustrates an example flowchart for predicting vehicle arrival times. As presented in the following sections, the term controller may refer to either controller 200 or processor 300 and the following acts may be performed by mobile device 122, server 125, or a combination thereof. Additional, different, or fewer acts may be provided. Mobile data may refer to location information sent from a mobile unit, other location based data, or other data sent from a mobile unit. The acts are performed in the order shown or other orders. The acts may also be repeated.

At act 520 historical mobile data 510 is received. The historical mobile data 510 may be grouped based on a time of day, day of week, time of week, time of year, or any other temporal grouping. All values determined from a particular temporal grouping may be considered representative of that temporal grouping. For example, historical mobile data may be grouped by weekend and weekday days.

The historical mobile data 510 may be used in act 550 to determine routes. The routes may be transit routes and stored as route information. Route information can be manually or automatically assembled into specific routes or a collection of routes. The routes may be determined automatically or manually. The routes include both geographic information and temporal information regarding the location of stops along the route, and the times vehicles historically arrive at the stops. Temporal clustering techniques may be applied to the historical mobile data to determine a specific schedule of arrival times for all stops along a route. Variances of arrival times may also be determined from a temporal clustering scheme. For example, within a cluster there may be 50 time points obtained from different vehicles across different days. A centroid of the cluster can be determined and considered the mean arrival time. From the 50 time points, a variance from the mean arrival time may also be ascertained. For example, an average of the individual absolute differences of the 50 time points from the mean arrival time may be considered the arrival time variance for a temporal cluster.

The routes may be constructed of segments, or other elements. The route information may represent actual physical roads, road segments, paths, or any other way provided for vehicle movement or travel. The routes may be transit routes such as a bus route, train route, or any other vehicle based transit route. The route information may be derived from historical mobile data 510, including collected position data of vehicles. The route information may include a defined or derived schedule. The schedule may also be derived from historical data, including collected position and time data of vehicles. The schedule may be a transit schedule having defined stops with minimum and maximum stop times for vehicles. The schedule may include defined times at which a vehicle should be at a location.

As a route may be determined directly from historical mobile data 510, if a transit system changes a route during a day, the historical mobile data 510 reflects that change if the historical mobile data 510 has been recorded and is representative of the time period since the change to the route. Route changes can happen in transit systems when planned roadways are under construction or for special events. Predicting arrival times of vehicles at particular stops along a transit line may in this way dynamically adapt to changing route geographies, with or without human intervention.

At act 530 historical arrival time values may be determined for a stop using the historical mobile data 510 and the route determined in act 550. The historical arrival time values include a historical average arrival time for a scheduled stop along a route at a time of day represented as q(t) 540. For example the historical mobile data may indicate that a determined q(t) 540 is 10:03 AM every weekday. The historical arrival time values may also include a historical arrival time variance for vehicles at a stop for the determined 10:03 AM q(t) 540. For example, the historical arrival time variance for vehicles at a stop for a time of day may be determined to be 3 minutes, and is represented as Q(t) 541.

At act 522 recent mobile data 512 is received. Recent mobile data 512 represents position data correlated with times for a recent plurality of vehicles to arrive at a particular stop on a route. The recent mobile data 512 may represent a number of the most recent vehicles to arrive at a stop.

At act 532 recent arrival time values are determined using the recent mobile data 512 and the determined route 550. The recent arrival time values include a recent arrival time variance from the historical average arrival time for a recent plurality of vehicles, denoted as r(t) 542, and a recent arrival time variance error, denoted as R(t) 443. R(t) 543 can be considered to be an error in the accuracy of the determined r(t) 542.

At act 524 current mobile data 514 representing at least the current location of a particular vehicle is received.

At act 534 current values are determined from the current mobile data 514 received in act 524 and the route determined in act 550. The current values determined may include a current route that a particular vehicle is currently traveling. The current values may also include an estimated travel time for the vehicle to travel from the current location of the vehicle to a specific stop of the route. When the travel time is added to the time the current location of the particular vehicle a rough projected arrival time at the stop is determined, denoted as a(t) 544. The travel time is a rough estimate of how long it will take a vehicle to travel the distance to a stop. In an embodiment, the travel time is estimated using a determined distance to a stop and a travel velocity of the vehicle. The travel velocity may be the current velocity of the vehicle, or an assumed velocity over a segment of a route. In another embodiment, the travel time is determined from the historical mobile data 510, and determining an average of the length of time required for the plurality of historical vehicles to travel the distance from the particular vehicle's current location and the location of the stop.

In act 501 an arrival time is predicted of the particular vehicle at a stop along a route as a function of the historical mean arrival time q(t) 540, the historical arrival time variance Q(t) 541, the recent arrival time variance r(t) 542, the recent arrival time variance error R(t) 443, and the travel time of the particular vehicle to the stop a(t) 544.

The function for predicting the arrival time x(t) of a vehicle at a stop may be represented by Equation 3:

$$x(t) = \left(\frac{R(t)}{Q(t) + R(t)}\right)q(t) + \left(\frac{Q(t)}{Q(t) + R(t)}\right)(a(t) - r(t)) \quad \text{Eq. 3}$$

Figure 6:
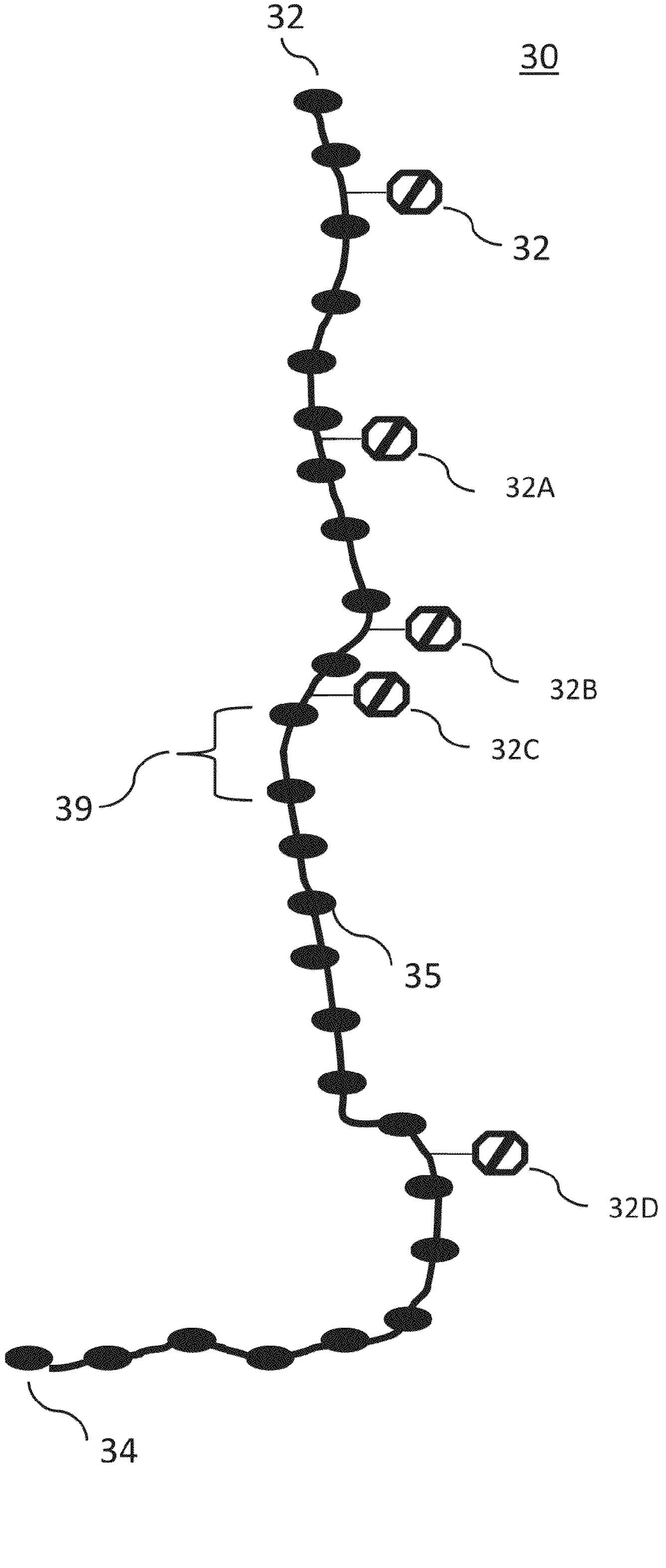
FIG. 6 illustrates an example transit route.

FIG. 6 illustrates an example of a transit route 30. The transit route 30 includes nodes 35, segments 39, and stops 32, 32A, 32B, 32C, and 32D. Transit route segments 39 may be the same length, or different lengths. The segments may be determined manually or automatically. Transit route segments 39 may be stop segments or regular segments. A stop segment is a segment that contains a transit stop. Transit route 30 comprises a route start 32, and a route end 34. The nodes 35 may be defined as a cluster of points. The nodes 35 may be at predetermined locations such as transit stops. The nodes 35 may be calculated based on location data collected by the mobile device 122 or multiple mobile devices.

Route data may be clustered spatially to determine specific routes automatically. The lengths of segments on specific routes may also be determined through clustering. For example, location data for a route is clustered from collected mobile device data from mobile devices associated with vehicles. A collection of location data for a single vehicle on a single trip may be called a trace. A seed trace may be determined that is the longest trace for a given route. Typically, the longest trace will have the most mobile device data reports. Other traces following the path of the seed trace are selected as a set. The other traces are grouped into clusters of data points within a certain distance from the location of the trace mobile device reports. Centroids of the clusters are then determined as a weighted average of the data points in a report. The Euclidian distances between the centroids may then be determined as the length of a route segment. The segments also are provided a route sequence number based on the sequential order of the segment for the route. Further, the distance from the clusters, or nodes, of a stop 32 is determined. The location of a stop 32 may be manually entered, or automatically determined based on a similar clustering technique.

In another embodiment, the server 125 may be configured to compare the location data to identify sets of data points. The sets of data points may be within a threshold distance from one another. In one example, the server 125 selects a location data point and counts the number of location data points within the threshold distance from the first selected data point. If the number of location data points exceeds a minimum number (e.g., 2, 5, 10), the set of data points are identified by the server 125 as a cluster. The cluster may be stored as a geographic range including the set of data points or the cluster may be stored as the average of the set of data points. The distance between clusters may be arbitrary as a result of dependence on the clustering of the data points. Alternatively, the server 125 may target a specific distance between clusters. Clusters may also be determined using any clustering technique. For example, K-means models, connectivity models, centroid models, distribution models, and graph based models may be used.

Route data may also be clustered temporally. The cyclic and repetitive nature of transit system schedules can create time based clusters of determined vehicle locations in the proximity of transit stops. In an embodiment, a time based centroid, or average, and standard deviation, or variance, of each cluster occurring during periods of time around a transit stop may be determined using a k-means clustering model. The resulting clusters of time based centroids for a transit stop would comprise a schedule of vehicle arrivals for that particular stop.

The route 30 may be comprised of legs representing a route in a single direction. An embodiment may be implemented on a particular leg of a route, or across an entire route. An embodiment may also be implemented on a singular segment of a route, or any collection of segments or sections of a route.

Figure 7:
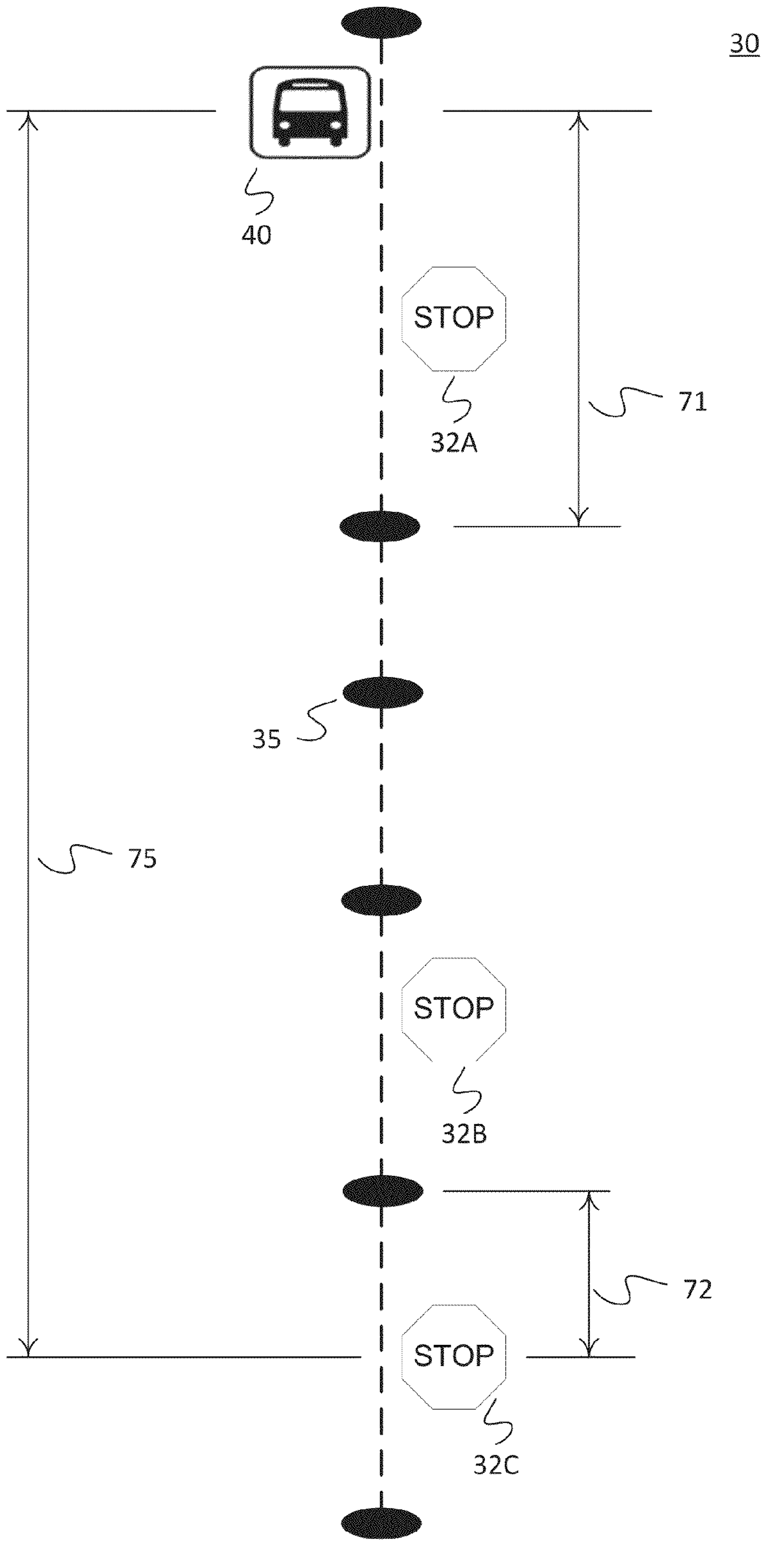
FIG. 7 illustrates an example of a vehicle on the transit route of FIG. 6.

FIG. 7 illustrates an example of a vehicle on transit route 30. Transit route 30 includes nodes 35 stops 32A, 32B, 32C, and vehicle 40.

In one embodiment, the arrival time of vehicle 40 at stop 32C is requested by a user. To predict the arrival time of vehicle 40 at stop 32C a travel time for vehicle 40 to travel to 32C may be needed. A travel time may be projected based on a geographic distance 75 required for vehicle 40 to travel to arrive at stop 32C. The geographic distance 75 may be determined by summing the lengths of segments connecting nodes 35 and adding the distance 71 between the vehicle's current location and the next node along with the distance 72 between a node and stop 32C. In this embodiment all values can be determined using mobile data and existing geographic data.

Once a travel distance is determined, a velocity can be applied to the travel distance to determine a travel time. The velocity may be the current measured velocity for the vehicle, or an assumed or average velocity for a segment or a particular run.

In another embodiment, average lengths of time for a vehicle to travel all the segments between the vehicle and stop 32C may be summed with the total time being the travel time required.

The determined travel time may be used with Equation 3, along with historical data representing the arrival times of vehicles at stop 32C, and recent data representing the several most recent vehicles arriving at stop 32C, to determine a predicted time of arrival for vehicle 40 at stop 32C. Similarly, the arrival time of vehicle 40 may be predicted for any of the other stops 32A or 32B.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term “invention” merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:

receiving historical location information associated with times for a historical plurality of vehicles along a route, wherein the route comprises a plurality of route stops;

determining, by a processor, a historical average arrival time, and associated historical arrival time variance, for a stop along the route using the historical location information;

receiving recent location information associated with times for a recent plurality of vehicles along the route;

determining, by the processor, a recent arrival time variance from the historical average arrival time at the stop, and a recent arrival time variance error at the stop, for the recent plurality of vehicles using the recent location information;

receiving current location information for a particular vehicle along the route, wherein the current location information comprises a specific current location;

determining, by the processor, a travel time to the stop for the particular vehicle along the route from the specific current location of the particular vehicle; and predicting a time of arrival of the particular vehicle at the stop along the route as a function of the historical average arrival time, the historical arrival time variance, the recent arrival time variance, the recent arrival time variance error, and the travel time of the particular vehicle to the stop.

2. The method of claim 1, wherein the function x(t) can be represented as:

$$x(t) = \left(\frac{R(t)}{Q(t)+R(t)}\right)q(t) + \left(\frac{Q(t)}{Q(t)+R(t)}\right)(a(t)-r(t))$$

where q(t) is the historical average arrival time;

Q(t) is the historical arrival time variance;

r(t) is the recent arrival time variance;

R(t) is the recent arrival time variance error; and a(t) is the travel time of the particular vehicle to the stop added to a current time.

3. The method of claim 1, wherein predicting the time of arrival comprises:

determining a weighted historical average arrival time weighted proportionally based on the recent arrival time variance error;

determining a weighted recent arrival time, wherein the weighted recent arrival time is determined by summing the recent arrival time variance and the travel time to the stop for the particular vehicle, and weighing the result proportionally based on the historical arrival time variance; and summing the weighted historical average arrival time to the weighted recent arrival time.

4. The method of claim 1, wherein the location information comprises mobile unit data, the route is determined by clustering the mobile unit data into a plurality of clusters, and the clusters are connected by route segments to form a route geographic path.

5. The method of claim 4, wherein the route geographic path is a variation of a pre-planned route geographic path.

6. The method of claim 1, wherein the recent plurality of vehicles comprises at least the two most recent vehicles that arrived at the stop prior to the particular vehicle.

7. The method of claim 1, wherein the historical location information and the recent location information are representative of a same time of week.

8. An apparatus comprising:

a memory configured to store data representing historical location information associated with times for a historical plurality of vehicles along a route, recent location information associated with times for a recent plurality of vehicles along the route, and current location information for a particular vehicle along the route, wherein the route comprises a plurality of route stops, the current location information comprises a specific current location, and the recent location information is independent of the historical location information; and a controller configured to:

determine a historical average arrival time, and associated historical arrival time variance, for a stop along the route using the historical location information; determine a recent arrival time variance from the historical average arrival time at the stop, and a recent arrival time variance error at the stop, for the recent plurality of vehicles using the recent location information; determine a travel time to the stop for the particular vehicle along the route from the particular current location of the particular vehicle; and predict a time of arrival of the particular vehicle at the stop along the route as a function of the historical average arrival time, the historical arrival time variance, the recent arrival time variance, the recent arrival time variance error, and the travel time of the particular vehicle to the stop.

9. The method of claim 1, wherein the recent location information is different than the historical location information.

10. The apparatus of claim 8, wherein the controller is further configured to:

determine a weighted historical average arrival time weighted proportionally based on the recent arrival time variance error; determine a weighted recent arrival time, wherein the weighted recent arrival time is determined by summing the recent arrival time variance and the travel time to the stop for the particular vehicle, and weighing the result proportionally based on the historical arrival time variance; and sum the weighted historical average arrival time to the weighted recent arrival time.

11. The apparatus of claim 8, wherein the location information comprises mobile unit data, the route is determined by clustering the mobile unit data into a plurality of clusters, and the clusters are connected by route segments to form a route geographic path.

12. The apparatus of claim 11, wherein the route geographic path is a variation of a pre-planned route geographic path.

13. The apparatus of claim 8, wherein the recent plurality of vehicles comprises at least the two most recent vehicles that arrived at the stop prior to the particular vehicle.

14. The apparatus of claim 8, wherein the historical location information and the recent location information are representative of a same time of week.

15. The apparatus of claim 14, wherein the recent location information is a subset of the historical location information.

16. A non-transitory computer readable medium including instructions that when executed are operable to:

determine a historical average arrival time, and an associated historical arrival time variance, for a stop along a route using historical location information for a historical plurality of vehicles along the route; determine a recent arrival time variance from the historical average arrival time at the stop for a recent plurality of vehicles using times for a recent plurality of vehicles along the route, wherein the recent plurality of vehicles and the historical plurality of vehicles are different; determine a travel time to the stop for a particular vehicle along the route from a specific current location for the particular vehicle along the route; and predict a time of arrival of the particular vehicle at the stop along the route as a function of the historical average arrival time, the historical arrival time variance, the recent arrival time variance, and the travel time of the particular vehicle to the stop.

17. The non-transitory computer readable medium of claim 16, wherein the instructions are further operable to:

determine a recent arrival time variance error at the stop for the recent plurality of vehicles; determine a weighted historical average arrival time weighted proportionally based on the recent arrival time variance error; determine a weighted recent arrival time, wherein the weighted recent arrival time is determined by summing the recent arrival time variance and the travel time to the stop for the particular vehicle, and weighing the result proportionally based on the historical arrival time variance; and sum the weighted historical average arrival time to the weighted recent arrival time.

18. The non-transitory computer readable medium of claim 16, wherein the location information comprises mobile unit data, the route is determined by clustering the mobile unit data into a plurality of clusters, and the clusters are connected by route segments to form a route geographic path.

19. The non-transitory computer readable medium of claim 16, wherein the recent arrival time variance is determined using a sliding window adaptive filter model.

20. An apparatus comprising:

a memory configured to store data representing historical location information associated with times for a historical plurality of vehicles along a route, recent location information associated with times for a recent plurality of vehicles along the route comprising the two most recent vehicles that arrived at a stop along the route, and current location information for a particular vehicle along the route, wherein the route comprises a plurality of route stops; and a controller configured to:

determine a historical average arrival time, and associated historical arrival time variance, for the stop along the route using the historical location information; determine a recent arrival time variance from the historical average arrival time at the stop, and a recent arrival time variance error at the stop, for the recent plurality of vehicles using the recent location information; determine a travel time to the stop for the particular vehicle along the route from the particular current location of the particular vehicle; and predict a time of arrival of the particular vehicle at the stop along the route as a function of the historical average arrival time, the historical arrival time variance, the recent arrival time variance, the recent arrival time variance error, and the travel time of the particular vehicle to the stop.

21. The method of claim 1, wherein the recent location information is different than the historical location information.

* * * * *

UNITED STATES PATENT AND TRADEMARK OFFICE

CERTIFICATE OF CORRECTION

PATENT NO. : 9,020,754 B2
APPLICATION NO. : 13/849012
DATED : April 28, 2015
INVENTOR(S) : Leo Modica et al.

It is certified that error appears in the above-identified patent and that said Letters Patent is hereby corrected as shown below:

In the claims:
Column 17, lines 42-44
claim 9 should read: The method of claim 1, wherein the historical location information, the recent location information, and current information are derived from mobile device data.

Signed and Sealed this
Twenty-fifth Day of August, 2015

Michelle K. Lee
*Director of the United States Patent and Trademark Office*